United States Patent Office 2,955,995
Patented Oct. 11, 1960

2,955,995

SOLVENTS FOR RADIOCHEMICAL REACTIONS

James F. Black, Roselle, William C. Hollyday, Jr., Fanwood, and Donald A. Guthrie, Cranford, N.J., assignors to Esso Research and Engineering Company, a corporation of Delaware No Drawing. Filed Dec. 2, 1955, Ser. No. 550,785

2 Claims. (Cl. 204—158)

This invention relates to radiochemistry and more particularly relates to solvents employed in radiochemical reactions. Still more particularly, the invention relates to polymerization reactions carried out by means of high intensity ionizing radiation employing as a solvent a highly refined mineral oil.

Polymerization reactions have generally been carried out heretofore employing certain chemical compounds as catalysts, such as the well-known class of peroxide polymerization catalysts. Recently it has been found that many polymerization reactions can be induced by employing high intensity ionizing radiation such as beta rays, gamma rays and neutrons. These radiochemical polymerization processes have a number of advantages over the more conventional polymerization processes employing chemical compounds as catalysts. More specifically, these advantages are:

(1) Polymerization carried out by means of high energy ionizing radiation is generally less expensive. This economic advantage is derived in part from the ready availability of large quantities of fission by-products from atomic reactors. Also, the radiochemical method is advantageous since generally it may be conveniently carried out at room temperature and atmospheric pressures if desired.

(2) The radiochemical polymerization reaction is more easily controlled. With chemical polymerization catalysts, the rate at which the chain initiators are produced depends not only upon the concentration of the catalyst and the temperature, but also upon little understood secondary chemical changes in the catalyst decomposition products. On the other hand, for example, the rate at which chain initiating gamma rays are produced by a radioactive source is constant. Therefore, at a given temperature, the polymerization will be quite even and not subject to sudden acceleration or deceleration as in the case with chemical catalysts. Also with conventional catalysts, it is necessary to heat the reaction mixture to initiate the polymerization process, after which rapid cooling may be required so that the polymerization does not get out of control. Difficult control problems of this type are avoided by radiochemical polymerization techniques.

(3) There is no catalyst contamination in the polymeric products produced in radiochemical processes. Since the radioactive source need not come in direct contact with the reactants, the problem of removing initiating materials from the polymeric product does not exist. The absence of catalyst contamination in the final product results in greater thermal stability of the polymer.

(4) Radiochemical polymerization methods are generally more readily adaptable to a continuous process. Since the irradiation is given out on a 24-hour basis from an irradiation source and since its emission is regular and not affected by temperature or other outside phenomena, the catalytic effect is controlled in radiation initiated polymerizations solely by the time of residence of the reactants within the radiation zone. A radiochemical polymerization process can be carried out on a 24-hour basis by merely pumping monomers through the radiation given out by a suitable source.

Frequently it is desirable to carry out radiochemical reactions, particularly polymerization reactions, employing a diluent or solvent for the reactants (or monomers). A number of various solvents have been employed heretofore for carrying out radiochemical polymerization reactions. The selection of an effective solvent for these radiochemical polymerization processes is highly important to the commercial prospects of such processes. Heretofore the solvents employed for such polymerization reactions have not been entirely suitable for commercial operations since they have either been too expensive or their use has effected a low conversion rate or low total conversion in the radiochemical polymerization processes. Since polymeric materials are finding increasing use as film-forming materials, plastics, molded articles, lubricating oil additives, tire raw materials, etc., it is important to develop a commercially attractive radiochemical polymerization process. The discovery of an inexpensive and effective solvent for such processes is an important aspect of this problem.

It has now been found that radiochemical reactions such as radiochemical polymerization reactions may be effectively carried out employing as a solvent or diluent in the process a highly refined mineral (petroleum) oil. A particularly preferred highly refined mineral oil useful for these purposes is a white oil, i.e., a highly refined mineral oil obtained by the treatment of petroleum distillates with fuming sulfuric acid or the like. It has been found that the use of these highly refined mineral oils offers a number of outstanding advantages as compared to other solvents used in radiochemical polymerization processes. These white oils are readily available commercially at low cost and are considerably less expensive than most other solvents. In addition, it has been found, surprisingly, that radiochemical polymerization processes or reactions carried out employing as a solvent a highly refined mineral oil, such as a white oil, proceed at a higher reaction rate than do similar reactions carried out with other hydrocarbon solvents such as toluene, heptane and octane. It has further been found that a higher overall yield of polymer is obtained using these highly refined mineral oils as compared to the use of other solvents such as carbon disulfide, toluene, chlorobenzene and heptane. In addition, the highly refined mineral oil is essentially inert in the radiochemical reaction and is also a solvent for a large number of monomers as well as the resultant polymeric products. Thus it will be appreciated that highly refined mineral oils such as white oils are exceedingly effective and useful, all factors being considered, as solvents for radiochemical reactions and particularly as solvents for radiochemical polymerization reactions.

It has further been found that radiochemical polymerization reactions can be still further improved by pretreating the highly refined mineral oil by blowing it with an inert gas to thereby remove dissolved oxygen prior to the polymerization reaction. The use of nitrogen in this connection is particularly preferred.

In carrying out the radiochemical reactions, the high energy ionizing radiation may be supplied by naturally occurring radioactive materials, such as radium and its daughters, which emit alpha, beta and gamma rays. Fission by-products of processes generating atomic power and/or fissionable materials which emit high energy gamma rays, afford a highly desirable and most abundant source of radioactivity suitable for the purposes of the invention. These by-products include elements with atomic numbers ranging from 30 (zinc) to 63 (europium) and their compounds. They are formed in the course of converting uranium, plutonium and other fissionable material in an atomic reactor.

Materials made radioactive by exposure to neutron radiation, such as radioactive cobalt ($Co^{60}$), europium$^{152}$ or europium$^{154}$ which emit gamma rays, may likewise be used. Suitable sources of high velocity electrons are also the beams of electron accelerators, such as the Van de Graaf generator or the betatron. In general, however, high intensity gamma radiation and its well-known sources, such as nuclear fission by-products and materials made radioactive by neutron radiation are particularly preferred for the purposes of the invention mainly because of the relatively high penetrating power of the gamma rays and the availability and ease of application of these sources of gamma radiation. Also a combination of gamma rays and neutrons is a preferred type of radiation.

The monomers employed in the present invention are those which polymerize in the presence of high intensity ionizing radiation. It will be understood in this connection that the polymeric products of this invention may be homopolymers, copolymers or polymeric products containing more than two constituent monomers. Specific classes and examples of ethylenically unsaturated polymerizable monomers which may be employed in this invention include:

Monomers—

Mono-olefins, e.g., ethylene, propylene, isobutylene, n-butylene, tetramethyl nonene, octadecene, styrene, methyl styrene; etc.

Di-olefins, e.g., butadiene, isoprene, dimethyl butadiene, pentadiene, cyclopentadiene, methylcyclopentadiene, etc.

Halo olefins, e.g., vinyl chloride, tetrafluoroethylene, trifluorochloroethylene, etc.

Esters of acrylic and of methacrylic acids, e.g., methyl acrylate, decyl acrylate, methyl methacrylate, lauryl methacrylate, mixed $C_8$ to $C_{18}$ methacrylates, diethylaminoethyl methacrylate, etc.

Vinyl esters, e.g., vinyl acetate, vinyl isobutyrate, vinyl 2-ethylhexoate, the vinyl ester of coconut acids, the vinyl ester of $C_{10}$ Oxo acids made by the oxonation of tripropylene, etc.

Vinyl ethers, e.g., vinyl isobutyl ether, vinyl decyl ether, the vinyl ether of $C_8$ Oxo alcohol made by the oxonation of a $C_7$ monoolefin (propylene-butylene copolymer), etc.

Esters of $\alpha,\beta$-unsaturated dibasic acids, e.g., ethyl fumarate, octyl fumarate, lauryl maleate, the aconitate and itaconate esters of mixed alcohols obtained by the hydrogenation of coconut oil acids, etc.

Unsaturated nitriles, e.g., acrylonitrile, methacrylonitrile, etc.

The highly refined mineral oils employed as solvents or diluents in accordance with the present invention in radiochemical reactions are preferably white oils. These white oils are generally obtained by treating a mineral oil (e.g., a petroleum distillate, particularly those derived from naphthenic crude oils) with fuming sulfuric acid. Generally the oleum treatment of the oil is continued until essentially no more sludge is formed by subsequent addition of the oleum. In commercial production of white oils, the oleum is generally added in successive dumps, after which the treated oil is settled and the resultant sludge is separated therefrom. In certain instances, the preliminary treatments with oleum may be replaced by treating the oil with aluminum chloride or extractive agents such as phenol or sulfur dioxide. Oil-soluble sulfonic acids produced in the oleum treatment are extracted with hot water or dilute alcohol. Preferably the oil-soluble sulfonic acids are neutralized to form, for example, the sodium sulfonate at the time of the alcohol extraction. The resultant neutral white oil may then be clay filtered to remove traces of sodium sulfonate, resins, etc. The production of white oils is well known to the art (see for example "The Science of Petroleum," Refinery Products, volume V, part III, pages 189–193, 1955 Edition) and need not be further described in this specification. Generally the white oils useful in the present invention are those which have an unsulfonated residue (as determined by ASTM D483–40) of at least 90%, preferably at least 95%, more preferably about 100%. Expressed in another way, the white oils useful in the present invention are those which remain unchanged in color when heated for 10 minutes with shaking at 100° C. in the presence of an equal volume of 95% $H_2SO_4$. It will be understood that other highly refined mineral oils equivalent in their degree of refining to white oils may be employed in the present invention.

The highly refined mineral oils useful in the present invention generally will have S.S.U. viscosities at 100° F. in the range of about 50 to 360, preferably about 75 to 250. These viscosities will generally correspond to petroleum white oils which boil within the range of about 400° to 950°, preferably about 500° to 750° F. (ASTM D158–41).

The radiochemical polymerization reaction is carried out in accordance with the present invention employing a mixture of (1) monomers polymerizable by means of high intensity ionizing radiation and (2) the highly refined mineral oil. Generally this mixture will contain about 1 to 90% by weight of the monomer and about 99 to 10% by weight of the highly refined mineral oil. More preferably, the mixture will contain about 10 to 80% by weight of the monomer and about 90 to 20% by weight of the highly refined mineral oil. The irradiation of the mixture of the monomers and solvent may be carried out generally at temperatures in the range of about 0° F. to 250° F., usually about 60° F. to 90° F. The irradiation may be carried out under vacuum, or at atmospheric or elevated pressure, but will be carried out generally at about atmospheric pressure. The present invention is operable utilizing irradiation times of a few seconds to 100 hours or more, usually about 0.01 to 50 hours, utilizing radiation intensities generally in the range of about $10^3$ to $10^8$, usually about $5 \times 10^4$ to $10^7$, roentgens per hour. The total radiation dosages useful in the present invention are generally within the range of about $5 \times 10^4$ to $5 \times 10^7$, usually about $2 \times 10^5$ to $10^7$ roentgens. Radiation sources of about 10 to $10^8$, usually about 300 to $10^6$ equivalent curies may be employed. It will be understood that the total radiation dosage will depend a great deal upon the particular monomers subjected to irradiation as well as upon the final polymeric product which is desired.

Generally it will be preferred to operate under conditions at which the highly refined mineral oil is a liquid or is in liquid phase. Also, generally it will be preferred to irradiate monomers which themselves as well as their polymeric products are soluble in the highly refined mineral oil. However, this is not essential to the present invention since the present radiochemical polymerization reaction may be carried out in emulsion phase. More specifically, the present polymerization process can be carried out successfully wherein the monomers themselves and/or the polymeric products thereof are essentially insoluble in the highly refined mineral oil. In this case the highly refined mineral oil acts as a diluent for an emulsion phase polymerization.

It is particularly preferred to pretreat the highly refined mineral oil prior to its utilization in the present radiochemical polymerization process by blowing the highly refined mineral oil with an inert gas to thereby remove dissolved oxygen. Specific examples of inert gases which may be employed include nitrogen, argon, carbon dioxide, methane, ethane and the like. Nitrogen is particularly preferred in this pretreating step. Generally this pretreating step may be carried out at temperatures of about 0° F. to 250° F., preferably about 60° F. to 100° F. The highly refined mineral oil is preferably blown with the inert gas until essentially all of the dissolved oxygen is removed therefrom. Generally this will require about 0.1 to 5 hours, usually about 0.5 to 2 hours, employing treating rates of about 1 to 200, usually about 10 to 50, v./v./hr. (volume of inert gas per volume of oil per hour).

As stated heretofore, the use of a highly refined mineral oil as a diluent or solvent in a radiochemical polymerization process has been found to be particularly outstanding. It will be understood, however, that these desirable results may also be realized in other radiochemical processes such as, for example, the degradation of certain other polymers which break down when exposed to ionizing radiation, and certain condensation, addition and alkylation reactions.

The invention will be more fully understood by reference to the following examples. It is pointed out, however, that the examples are given for the purpose of illustration only and are not to be construed as limiting the scope of the present invention in any way.

EXAMPLE I

The polymerization, by means of gamma rays, of vinyl-2-ethyl hexoate dissolved in a commercially available white oil (White Oil A) was carried out as described below. White Oil A had a S.S.U. viscosity at 100° F. of about 145 and was obtained by the treatment of a naphthenic mineral oil distillate (which had previously been caustic washed, phenol extracted and clay filtered) with 30 wt. percent of fuming (106%) sulfuric acid. For purposes of comparison, a number of other solvents were also evaluated in similar radiochemical polymerization reactions.

The polymerizations were carried out by dissolving 30% by weight of vinyl-2-ethyl hexoate in the solvent under study. Several portions of each solution were then placed in separate sealed bottles, and inserted in the center of cylindrical cobalt[60] sources at a temperature of 0° F. The radiation intensities to which these samples were exposed ranged from 210,000 to 235,000 roentgens/hour. Each sample was then exposed for an appropriate period of time at 0° F. to accumulate the total radiation dose indicated in Table I and then removed from the source. The conversion was determined either by direct isolation of the polymer after evaporation of the solvent, or by decrease in the bromine number of the sample compared to that of the unirradiated blank. Identical conversion values were obtained in those cases (e.g., the runs in isopropanol and heptane) in which both methods of estimating conversion were employed. The results of the above-described polymerization reactions are reported in Table I.

Table I

GAMMA IRRADIATION OF VEH[1] IN VARIOUS SOLVENTS AT 0° F.

| Solvent | Radiation Dose (MR)[1] | VEH[2] Conversion (Percent) |
|---|---|---|
| White Oil A (Series 1) | 0.70 | 1.8 |
|  | 1.88 | 23.6 |
|  | 2.52 | 31.9 |
|  | 3.63 | 63.4 |
|  | 5.64 | 89.5 |
| White Oil A (Series 2) | 1.76 | 17.8 |
|  | 1.88 | 18.1 |
|  | 3.36 | 63.0 |
|  | 5.64 | 88.5 |
| Carbon Disulfide | 1.68 | 0.7 |
|  | 3.36 | 1.9 |
|  | 5.04 | 3.2 |
|  | 10.08 | 7.7 |
| Toluene | 2.64 | 1.0 |
|  | 3.15 | 1.9 |
|  | 4.20 | 5.0 |
|  | 6.30 | 13.2 |
|  | 8.0 | 22.4 |

Table I—Continued

| Solvent | Radiation Dose (MR)[1] | VEH[2] Conversion (Percent) |
|---|---|---|
| Chlorobenzene | 2.10 | 9.7 |
|  | 2.73 | 15.9 |
|  | 3.57 | 23.4 |
|  | 5.04 | 35.2 |
| Heptane | 1.26 | 1.3 |
|  | 1.76 | 2.9 |
|  | 2.10 | 4.1 |
|  | 2.64 | 8.0 |
|  | 3.78 | 18.0 |
|  | 4.00 | 23.8 |
|  | 5.25 | 39.5 |
|  | 5.50 | 41.7 |
|  | 7.79 | 71.0 |
| Isopropanol | 1.76 | 7.8 |
|  | 2.10 | 15.0 |
|  | 2.64 | 30.6 |
|  | 3.00 | 33.5 |
|  | 4.00 | 44.2 |
| Acetone | 1.68 | 8.0 |
|  | 2.10 | 16.9 |
|  | 2.52 | 29.4 |
|  | 2.94 | 33.2 |
|  | 3.36 | 36.4 |

[1] Megaroentgens.
[2] Vinyl-2-ethyl hexoate.

The results of these experiments reported in Table I show the marked superiority of White Oil A as a solvent for radiation initiated polymerization reactions. The conversion of monomer to polymer, for a given total radiation dose, in the white oil solvent was much greater than in any other type of solvent studied. It was even markedly superior to heptane as a solvent in this respect.

EXAMPLE II

In this example, vinyl-2-ethyl hexoate was polymerized in White Oil A (described in Example I) employing three different concentrations (namely, 10%, 30% and 50% by weight) of the monomer in the white oil. These polymerizations were carried out in exactly the same manner as outlined in Example I. Conversion levels again were obtained by the change in the bromine number of the sample upon irradiation. The data in this example are summarized below in Tables II and III:

Table II

VISCOSITY OF VINYL-2-ETHYL HEXOATE POLYEMRS
[At 100% conversion level]

| Initial Monomer Concentration at which Polymer was Prepared by Irradiation | Viscosity (10% of Polymer in White Oil A; 100° F., SUS)[1] | |
|---|---|---|
|  | Prepared at 0° F. | Prepared at 140° F. |
| 10% in White Oil A | 246 | 211 |
| 30% in White Oil A | 341 | 277 |
| 50% in White Oil A | 498 | 386 |

[1] 10% monomer in White Oil A = 84 SUS/100° F.

Table III

POLYMERIZATION RATE DURING GAMMA IRRADIATION OF VINYL-2-ETHYL HEXOATE

| Initial Monomer Concentration (Wt. Percent in White Oil A) | Polymerization Rate (Bromine No. Decrease/MR)[1] | |
|---|---|---|
|  | 0° F. | 140° F. |
| 10 | 3.7 | 4.9 |
| 30 | 7.3 | 11.1 |
| 50 | 9.6 | 19.0 |

[1] Megaroentgens.

The data in Table II show that the molecular weight of the polymer (as measured by its viscosity at 10% in White Oil A) at the point of complete conversion was a function of two variables; the initial monomer concentration and the temperature at which the system was irradiated. The molecular weight was higher (at the same temperature) in those runs employing a higher initial monomer concentration. The molecular weight was also higher (at the same initial monomer concentration) in those runs which were carried out at the lower temperature of 0° F.

The data in Table III show that the rate of polymerization (defined as bromine number decrease per megaroentgen) is also a function of the initial monomer concentration and of the temperature. Higher rates (at a given temperature) were obtained when more monomer was present in the system; and also that, in this case, a higher rate was obtained (at a given initial monomer concentration) at the higher temperature of 140° F.

EXAMPLE III

In this example, the effect of oxygen was determined on the polymerization of vinyl-2-ethyl hexoate in White Oil A. A series of four runs was carried out as follows: A 30% blend by weight of vinyl-2-ethyl hexoate in White Oil A was prepared and divided into 5 portions. The samples for runs 1 and 3 were exposed to the air for a day and then sealed in 50 cc. bottles. The sample for run 2 was placed in a 50 cc. bottle and oxygen was bubbled through the system for 4 hours and the bottle was immediately sealed. The sample for run 4 was placed in a 50 cc. bottle and all air or oxygen was purged from the system by bubbling nitrogen through the solution for 4 hours and then sealing the bottle. These four samples were then exposed to gamma radiation at 0° F. as described in Example I and the conversions after irradiation were obtained by comparison of the bromine numbers of the irradiated samples with that of the unirradiated blank which was retained for this purpose.

The results of these runs are shown in Table IV.

The data summarized in Table IV show that oxygen inhibits the gamma initiated polymerization of vinyl-2-ethyl hexoate and that removal of most of the oxygen by a nitrogen purge increases the conversion which may be obtained for a given exposure to ionizing radiation. Thus, after exposure to 5.64 megaroentgens of gamma radiation, a 93% conversion to polymer was obtained in a solution saturated only with air, while a conversion of only 20% was obtained (for the same radiation dose) in a solution saturated with pure oxygen. On the other hand, after exposure to only 1.88 megaroentgens of gamma radiation, a conversion of 54% was obtained from a solution purged with nitrogen; while, for the same radiation dose, a conversion of only 21% was obtained in an air saturated solution.

Table IV
EFFECT OF OXYGEN AND NITROGEN ON THE INITIATION OF POLYMERIZATION BY GAMMA RADIATION

[0° F.; 30% vinyl-2-ethyl hexoate in White Oil A]

| Run No. | Conditions | Total Radiation Dosage ($10^6$ R) | Conversion (Percent) |
|---|---|---|---|
| 1 | | 5.64 | 93 |
| 2 | Oxygen added | 5.64 | 20 |
| 3 | | 1.88 | 21 |
| 4 | Oxygen purged from the system with nitrogen. | 1.88 | 54 |

EXAMPLE IV

In this example other monomers were polymerized under the influence of gamma radiation while dissolved in either White Oil A (described in Example I) or in White Oil B. White Oil B had an S.S.U. viscosity at 100° F. of about 85 and was obtained by the treatment of a naphthenic mineral oil distillate (S.S.U. @ 100° F.=100) with 30 wt. percent of fuming (106%) sulfuric acid. White Oil B had a specific gravity of about 0.865 at 60° F., a viscosity index of about 73, a Pensky flash point of about 360° F., a cloud point of about 32° F. and a pour point of about −25° F.

The polymerizations were carried out exactly as described in Example I using the monomers listed in Table V. After exposure to the radiation the viscosity of the product was determined in order to demonstrate whether polymerization had occurred. The results of these experiments are summarized below in Table V.

Table V
GAMMA INITIATED POLYMERIZATION IN WHITE OIL SOLVENTS

| System Irradiated | | Irradiation Conditions | | Viscosity of Product [1] | |
|---|---|---|---|---|---|
| Monomers | Solvent | Temp. (° F.) | Radiation Dose (MR) | Concentration (percent) | 100° F., SUS | 210° F., SUS |
| 50% Vinyl Coconate [2] | White Oil A | | | 50 | 54 | |
| Do | do | 0 | 11.3 | 50 | 446 | |
| Do | do | 0 | 22.6 | 50 | 646 | |
| 50% C₈ Oxo [3] methacrylate | do | | | 50 | | <32 |
| Do | do | 70 | 1.9 | 20 | | 764 |
| 50% C₁₃ Oxo [3] methacrylate | do | | | 50 | | 34 |
| Do | do | 0 | 1.9 | 20 | | 1,662 |
| Do | do | 70 | 1.9 | 20 | | 1,003 |
| 50% (80/20) C₈ Oxo [3] Lorol B [2] methacrylate. | do | | | 50 | | <32 |
| Do | do | 70 | 1.9 | 20 | | 584 |
| 50% (80/20) Lorol B [2] Fumurate-Vinyl Acetate. | do | | | 50 | | 38 |
| Do | do | 70 | 6.0 | 50 | | 566 |
| 50% (80/20) Lorol B [2] Maleate-Vinyl Acetate. | do | | | 50 | 55 | |
| Do | do | 0 | 1.9 | 50 | 306 | |
| Do | do | 70 | 1.9 | 50 | 305 | |
| 50% C₁₃ Oxo [3] Methacrylate | White Oil B | | | 20 | 66 | 35 |
| Do | do | 70 | 1.9 | 20 | 2,272 | 1,450 |

[1] Determined in same white oil used as solvent for irradiation.
[2] Acids/alcohols obtained from coconut oil.
[3] Alcohols obtained by the "Oxo" process.

The data in Table V show that excellent conversions to polymer products are obtained using either White Oil A or White Oil B as solvents for various monomers such as vinyl esters, esters or mixed esters of methacrylic acid and esters of fumaric or maleic acids. In every case there was a substantial increase in the viscosity of the solution after irradiation as compared to the viscosity of the unirradiated monomer white oil solutions.

What is claimed is:

1. An improved polymerization method which comprises irradiating a mixture of about 30% by weight of vinyl-2-ethyl hexoate and about 70% by weight of a deoxygenated white oil having an SSU viscosity at 100° F. in the range of from 75 to 250 and boiling in the range of from 500° to 750° F. with gamma rays at a temperature of about 0° to 250° F. employing a radiation dosage in the range of about $5 \times 10^4$ to $5 \times 10^7$ roentgens.

2. An improved polymerization process which comprises subjecting a 1–90% blend by weight of vinyl-2-ethyl hexoate in a deoxygenated highly refined mineral oil having an S.S.U. viscosity at 100° F. in the range of about 75 to 250 and boiling in the range of about 500° to 750° F., to from about $5 \times 10^4$ to $5 \times 10^7$ roentgens of gamma radiation at a temperature in the range of about 0° to 250° F.

References Cited in the file of this patent

UNITED STATES PATENTS

| 2,743,223 | McClinton | Apr. 24, 1956 |

FOREIGN PATENTS

| 665,262 | Great Britain | Jan. 23, 1952 |
| 683,465 | Great Britain | Nov. 26, 1952 |

OTHER REFERENCES

Callinan: J. Electrochem. Soc., vol. 103, No. 3, May 1956, pages 292–296.

Wall et al.: "Modern Plastics," vol. 30, pages 111, 112, 114, 116, 176, 178, July 1953.

Ballantine: "Modern Plastics," pages 131, 132, 134, 136, 142, 228–230, 232, November 1954.